US012319797B2

(12) United States Patent
Goerlitz

(10) Patent No.: US 12,319,797 B2
(45) Date of Patent: Jun. 3, 2025

(54) POLYOLEFIN FILM AND USE THEREOF

(71) Applicant: Topas Advanced Polymers GmbH, Raunheim (DE)

(72) Inventor: Wolfram Goerlitz, Wiesbaden (DE)

(73) Assignee: Topas Advanced Polymers GmbH, Raunheim (DE)

(*) Notice: Subject to any disclaimer, the term of this patent is extended or adjusted under 35 U.S.C. 154(b) by 448 days.

(21) Appl. No.: 16/605,261

(22) PCT Filed: Apr. 6, 2018

(86) PCT No.: PCT/EP2018/000164
§ 371 (c)(1),
(2) Date: Oct. 15, 2019

(87) PCT Pub. No.: WO2018/197034
PCT Pub. Date: Nov. 1, 2018

(65) Prior Publication Data
US 2021/0147645 A1    May 20, 2021

(30) Foreign Application Priority Data

Apr. 27, 2017    (DE) .................. 10 2017 004 111.3

(51) Int. Cl.
| | | |
|---|---|---|
| *C08J 5/18* | (2006.01) | |
| *B29C 55/12* | (2006.01) | |
| *B29C 55/30* | (2006.01) | |
| *C08F 10/02* | (2006.01) | |
| *C08F 10/06* | (2006.01) | |
| *C08F 232/08* | (2006.01) | |
| *C08L 23/14* | (2006.01) | |
| *C08L 23/20* | (2006.01) | |
| *H01G 4/18* | (2006.01) | |

(52) U.S. Cl.
CPC ............ *C08J 5/18* (2013.01); *B29C 55/12* (2013.01); *B29C 55/30* (2013.01); *C08F 10/02* (2013.01); *C08F 10/06* (2013.01); *C08F 232/08* (2013.01); *C08L 23/142* (2013.01); *C08L 23/20* (2013.01); *H01G 4/18* (2013.01); *C08F 2420/00* (2013.01); *C08J 2323/06* (2013.01); *C08J 2323/12* (2013.01); *C08J 2323/16* (2013.01); *C08J 2323/20* (2013.01); *C08L 2203/16* (2013.01); *C08L 2203/20* (2013.01); *C08L 2205/02* (2013.01); *C08L 2205/22* (2013.01)

(58) Field of Classification Search
CPC ... C08J 5/18; C08F 10/02; C08F 10/06; C08F 232/08; C08L 23/142; C08L 23/20; B29C 55/12; B29C 55/30; H01G 4/18
USPC ....................................................... 428/215
See application file for complete search history.

(56) References Cited

U.S. PATENT DOCUMENTS

| | | | |
|---|---|---|---|
| 5,416,959 A | 5/1995 | Forrest, Jr. | |
| 5,468,440 A * | 11/1995 | McAlpin | B29C 55/005 |
| | | | 156/244.14 |
| 5,724,222 A | 5/1998 | Hirano et al. | |
| 6,068,936 A * | 5/2000 | Peiffer | C08L 23/10 |
| | | | 156/244.11 |
| 2004/0038012 A1* | 2/2004 | Cook | B32B 27/34 |
| | | | 428/212 |
| 2006/0020084 A1* | 1/2006 | Heukelbach | C08L 23/0823 |
| | | | 525/191 |
| 2007/0104961 A1* | 5/2007 | Awaji | B32B 27/18 |
| | | | 428/423.1 |
| 2008/0113116 A1* | 5/2008 | Hiraike | C08L 45/00 |
| | | | 524/80 |
| 2008/0277297 A1* | 11/2008 | Busch | B32B 3/26 |
| | | | 428/458 |
| 2014/0162041 A1* | 6/2014 | Jester | B32B 27/302 |
| | | | 428/339 |

FOREIGN PATENT DOCUMENTS

| | | |
|---|---|---|
| CA | 2115196 C | 11/2004 |
| DE | 19536043 A1 | 10/1997 |
| DE | 10242730 A1 | 3/2004 |
| DE | 102010034643 A1 | 2/2012 |
| EP | 0827975 A2 | 3/1998 |
| EP | 0992531 A1 | 12/2000 |
| EP | 2481767 A2 | 8/2012 |

(Continued)

OTHER PUBLICATIONS

Machine_English_translation_WO_2012022409_A; Grimm, M, et.al.; Cycloolefin Polymer Compositions, Molded Bodies, and Use of Said Molded Bodies; Feb. 23, 2012; EPO; whole document (Year: 2012).*

(Continued)

*Primary Examiner* — Tahseen Khan
(74) *Attorney, Agent, or Firm* — Dunlap Bennett & Ludwig, PLLC; Anna L. Kinney

(57) ABSTRACT

Disclosed are biaxially stretched polyolefin films containing
a) 10 to 45% by weight of a cycloolefin polymer with a glass transition temperature between 120 and 170° C., and
b) 90 to 55% by weight of a semi-crystalline alpha-olefin polymer with a crystallite melting temperature between 150 and 170° C.,
wherein the glass transition temperature of component a) being less than or equal to the crystallite melting temperature of component b), and wherein the polyolefin film has a shrinkage at 130° C. after 5 minutes, as measured according to ISO 11501, of less than or equal to 2%.

These polyolefin films are excellent suited as dielectrics for capacitors but also for other applications and are distinguished by a low shrinkage at high temperatures.

23 Claims, No Drawings

(56) References Cited

FOREIGN PATENT DOCUMENTS

| JP | 01318052 A | * | 12/1989 | |
| JP | 09270361 A | * | 10/1997 | ............. H01G 4/18 |
| JP | H09270361 A | | 10/1997 | |
| JP | 2017052932 A | | 3/2017 | |
| WO | 2000063013 A2 | | 10/2000 | |
| WO | WO-2012022409 A1 | * | 2/2012 | ............. C08L 23/06 |
| WO | 2015091829 A1 | | 6/2015 | |

OTHER PUBLICATIONS

Machine_english_translation_JP_09270361_A1; Kobayashi, Y, et.al.; Polyolefin Film for Capacitor and Capacitor Made or the Same; Oct. 14, 1997; EPO; whole document (Year: 1997).*

Machine_English_translation_JP_01318052_A, Moriya et al.; Polyolefin Resin Composition; Dec. 22, 1989; EPO; whole document (Year: 2024).*

Examination report in related Indian patent application mailed Aug. 7, 2020.

International Preliminary Report on Patentability with Written Opinion dated Nov. 7, 2019 (English translation).

Japanese Office Action mailed Dec. 21, 2021.

* cited by examiner

POLYOLEFIN FILM AND USE THEREOF

CLAIM FOR PRIORITY

This application is a national phase application of PCT/EP2018/000164 FILED Apr. 6, 2018, which was based on application DE 10 2017 004 111.3 FILED Apr. 27, 2017. The priorities of PCT/EP2018/000164 and DE 10 2017 004 111.3 are hereby claimed and their disclosures incorporated herein by reference.

TECHNICAL FIELD

The present invention concerns polyolefin films that can be used as electrical insulators or as dielectrics. These polyolefin films are characterized by a low dielectric loss factor, by low shrinkage and by a low friction coefficient.

BACKGROUND

Insulators comprising thermoplastic resins are used, for example, for the insulation in earth, for layer insulation and for insulation of conductors in engines, for the insulation of transformers and as a dielectric of capacitors. In addition, use of papers, textiles, and products impregnated with mica is also common. As thermoplastic resins used in these insulators, polypropylenes (PP) are the most prevalent. Biaxially stretched PP films (BOPP Films) for use as dielectric in capacitors are described in several patent documents, for example in WO 2015/091829 A1, U.S. Pat. No. 5,724,222 A and EP 2 481 767 A2.

BOPP films have excellent electrical and mechanical properties. However, their durability at elevated temperatures leaves something to be desired. This manifests itself in an increased shrinkage, which usually occurs at temperatures above 100° C., which results in a deformation of the capacitors produced from these films. The metallization applied to the film surfaces also suffers, which can lead to a functional inability of the capacitors produced from them.

Cycloolefin polymers are known amorphous polymers that are e.g. available under Trade Names TOPAS®, APEL®, ZEONOR® or ZEONEX®. Cycloolefin polymers are characterized by an adjustable heat distortion temperature HDT/B, by high optical transparency, high stiffness and exceptional purity, so that the materials can be used for packaging of food and in medical devices and also as primary packaging in direct contact with an active ingredient.

Cycloolefin polymers have been used for years for the production of films, optical components and containers of all kinds due to their excellent transparency.

Capacitor films based on cycloolefin polymers are also known for a long time, for example from EP 0 992 531 A1, WO 00/63013 A2 or CA 2 115 196 C. Due to their high glass transition temperatures, these films can usually only be processed on special machines. In addition, the stretchability of these films leaves something to be desired. A high level of stretchability is particularly desirable in the production of thin films.

Films made from mixtures of cycloolefin polymers and PP are also known. JP H05-262,989 A discloses biaxially stretched films made from a mixture of 40-98% by weight of crystalline polyolefin and 2-60% by weight of copolymer derived from ethylene and a cyclic olefin. The glass transition temperatures for the cycloolefin polymer used are from 50 to 190° C., preferably from 80 to 170° C. As a crystalline melting point for the PP used, 120 to 180° C. are specified. There is no indication that cycloolefin polymer and PP must be subjected to a special selection in terms of glass transition temperature and crystalline melting temperature. These films are used as packaging material.

DE 10 2010 034 643 A1 discloses compositions containing at least one cycloolefin polymer with a glass transition temperature of at least 140° C., at least one polymer derived from alpha olefin(s) and at least one selected copolymer as a component improving the compatibility of these components. This document also describes the possible use of films from this composition as capacitor films, but without giving further details.

Polyolefin films are known from DE 195 36 043 A1 which comprise polyolefin and cycloolefin polymer, whereby the cycloolefin polymer is amorphous, has a medium molecular weight $M_w$ in the range from 200 to 100000, which is no more than 50% of the $M_w$ of the polyolefins and which cycloolefin polymer is a homopolymer or shows at maximum of 20% by weight of comonomer content. Due to the low comonomer content, the cycloolefin polymers have high glass transition temperatures. On the other hand, this document also discloses the use of cycloolefin polymers with very low glass transition temperatures of up to 0° C. The description contains general information on the production of films from these compositions. Biaxial stretching is also disclosed. However, this document gives no indication of the production of biaxially stretched films with low shrinkage. The compositions are suitable for the production of packaging films.

Although the electrical properties of cycloolefin polymer films are of interest for capacitor applications, their marketing has so far failed because they are difficult to produce with conventional film technology. In addition, PP is significantly superior in price compared to the cycloolefin polymer.

There is currently growing interest in capacitors with higher temperature resistance. For a number of applications, such as inverter technology, silicon carbide semiconductors and electric mobility, capacitors are required that are suitable for higher use temperatures.

SUMMARY OF INVENTION

The present invention provides films with higher temperature resistance, which can be produced on standard film stretching systems or on somewhat modified standard film stretching systems. Surprisingly, it was found that by using comparatively small amounts of cycloolefin polymers with selected glass transition temperatures in combination with (partly) crystalline polyolefins with crystalline melting points that are located near the glass transition temperatures of the cycloolefin polymers, films can be produced with improved continuous use temperatures. This is reflected in the shrink behavior of the films. Even small proportions of cycloolefin polymer are sufficient to shift the use of the shrinkage to significantly higher temperatures.

In addition, the film according to the invention shows a selected surface roughness. This is important for the further processing of the films intended for use as capacitor films. Too high roughness means a risk to the electrical properties (peak discharges). Surprisingly it was found that with the plastic mixture used according to the invention, the necessary roughness can be achieved solely by the adjustment of blend morphology and by process management, so that the addition of additives can be dispensed with or can be kept to a minimum. Such additives often result in unfavorable electrical properties of the films.

Furthermore, it has also been shown, surprisingly, that low additions of cycloolefin polymers to (partly) crystalline polyolefins maintain the excellent stretchability of polyolefin films while improving at the same time the thermal resistance of the manufactured polyolefin films significantly. Capacitor films made from (partly) crystalline polyolefins, such as BOPP films, show failure symptoms due to the low glass transition temperatures of the polyolefins at temperatures above 100° C.

One objective of the present invention is the provision of polyolefin films having excellent thermal resistance and showing only a slight shrinkage tendency, even at temperatures above 100° C., especially above 120° C.

Another objective of the present invention is the provision of polyolefin films possessing excellent insulation properties and a low dielectric loss factor, which can be easily processed into capacitors without the film being cut off or entangled during winding up.

The present invention concerns a biaxially stretched polyolefin film containing
a) 10 to 45% by weight of a cycloolefin polymer with a glass transition temperature between 120 and 170° C., and
b) 90 to 55% by weight of a semi-crystalline alpha-olefin polymer with a crystallite melting temperature between 150 and 170° C.,
wherein the glass transition temperature of component a) being less than or equal to the crystallite melting temperature of component b), and wherein the polyolefin film has a shrinkage at 130° C. after 5 minutes, as measured according to ISO 11501, of less than or equal to 2%.

The biaxially stretched polyolefin film of the invention preferably has a surface roughness $R_a$, measured according to DIN EN ISO 4287, from 0.02 to 0.5 μm, preferably from 0.04 to 0.2 μm. Furthermore, the film according to the invention preferably shows a $R_z$, measured according to DIN EN ISO 4287, from 0.1 to 2 μm, in particular from 0.3 to 0.8 μm, and preferably a $R_{max}$, measured according to DIN EN ISO 4287, from 0.1 to 2 μm, in particular from 0.3 to 1 μm.

DETAILED DESCRIPTION

The cycloolefin polymers used according to the invention are known polymers. These can be polymers derived from a monomer or from two or more different monomers.

The cycloolefin polymers are produced by ring-opening or, in particular, by ring-sustaining polymerisation, preferably by ring-sustaining copolymerisation of cyclic olefins, such as norbornenene, with non-cyclic olefins, such as alpha olefins, especially ethylene.

By choosing the catalysts, it is possible to control in a known manner whether the olefinic ring of the cyclic monomer is preserved or opened during polymerisation. Examples of cycloolefin ring-opening polymerisation techniques can be found in EP 0 827 975 A2. Examples of catalysts used mainly in ring-sustaining polymerisation are metallocene catalysts. An overview of possible chemical structures of cycloolefin-derived polymers can be found, for example, in Pure Appl. Chem., Vol. 77, No. 5, pp. 801-814 (2005).

The term "cycloolefin polymer" is also to be understood in the context of this description as polymers which have been subjected to hydrogenation after polymerisation in order to reduce still existing double bonds.

The cycloolefin polymers used according to the invention are thermoplastics, which are characterised by an extraordinarily high level of transparency.

The glass transition temperature (referred to below as "Tg") of the cycloolefin polymers can be set by the skilled person in a well-known manner by selecting type and quantity of monomers, e.g. the type and quantity of cyclic and non-cyclic monomers. For example, from norbornene-ethylene copolymers it is known that the higher the proportion of the norbornene component in the copolymer, the higher is the glass transition temperature. The same applies to combinations of other cyclic monomers with non-cyclic monomers.

In the context of the present description, under a glass transition temperature a temperature is to be understood which has been determined according to ISO 11357 with the differential scanning calorimetry (DSC) method, with the heating speed being 10 K/minute.

Cycloolefin polymers with glass transition temperatures between 120 and 170° C. are used in the polymer films according to the invention, preferably between 130 and 170° C. and especially preferred between 140 and 160° C.

In another preferred embodiment of the polymer film according to the invention, cycloolefin copolymers are used, which are derived from the ring-sustaining copolymerisation of at least one cycloolefin of the general formula (I) with at least one alpha-olefin of the formula (II)

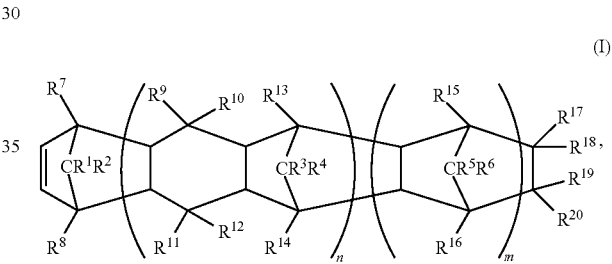

in which n is 0 or 1,
m is 0 or a positive integer, especially 0 or 1,
$R^1$, $R^2$, $R^3$, $R^4$, $R^5$, $R^6$ independently of one another are hydrogen, halogen, alkyl groups, cycloalkyl groups, aryl groups or alkoxy groups,
$R^7$, $R^8$, $R^9$, $R^{10}$, $R^{11}$, $R^{12}$, $R^{13}$, $R^4$, $R^{15}$, $R^{16}$ independently of one another are hydrogen or alkyl groups,
$R^{17}$, $R^1$, $R^{19}$, $R^{20}$ independently of one another are hydrogen, halogen or alkyl groups,
in which $R^{17}$ and $R^{19}$ can also be bonded to each other, to form a single ring or ring system with several rings, whereby the ring or the rings can be saturated or unsaturated,

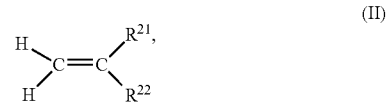

in which $R^{21}$ and $R^{22}$ independently of one another are hydrogen or alkyl groups.

In a particularly preferred embodiment, cycloolefin copolymers are used, which are derived from compounds of formulae I and II, in which n is 0, m is 0 or 1, $R^{21}$ and $R^{22}$ both mean hydrogen or $R^{21}$ is hydrogen and $R^{22}$ is an alkyl group with one to eight carbon atoms, and $R^1$, $R^2$, $R^5$ to $R^8$ and $R^{15}$ to $R^{20}$ preferably mean hydrogen.

In a particularly preferred embodiment, cycloolefin copolymers are used, which are derived from compounds of formulae I and II, in which the compound of formula I is norbornene or tetracyclododecene and the compound of formula II is ethylene.

Copolymers of the above defined type are particularly preferred, with their copolymerisation taking place in the presence of a metallocene catalyst.

Preferred types of cycloolefin copolymers are described in the DE 102 42 730 A1. Particularly preferred are cycloolefin polymers of types Topas® 6013, Topas® 6015 and Topas®5013 (Topas Advanced Polymers GmbH, Frankfurt am Main).

The production of the cycloolefin copolymers preferably used in the invention takes place under ring-sustaining polymerisation, i.e. the bi- or polycyclic structure of the monomer units used is preserved during polymerisation. Examples of catalysts include titanocene, zirconocene or hafnocene catalysts, which are typically used in combination with aluminoxanes as co-catalysts. This production method has already been described many times, for example in the patent document mentioned above.

Typical examples of cycloolefin copolymers are copolymers from norbornene or tetracyclododecene with ethylene. Such Polymers are commercially available, for example under the Trade Names APEL®, ARTON® or TOPAS®.

Other examples include cycloolefin polymers derived from ring-opening polymerisation from cyclopentadiene or norbornene. Such Polymers are also commercially available, for example under the Trade Names ZEONEX® or ZEONOR®.

Preferably, cycloolefin copolymers derived from the monomers of formulae I and described above are used, wherein these monomers I and are applied in a molar ratio of 95:5 to 5:95, and which may optionally have small proportions of structural units, for example having up to 10 mol %, in relation to the total monomer quantity, derived from other monomers, such as from propylene, pentene, hexene, cyclohexene and/or styrene.

Particularly preferred are cycloolefin copolymers, which consist mainly of norbornene and ethylene, and which may still have small proportions, e.g. up to 5% by weight, in relation to the total monomer quantity, of structural units derived from other monomers, such as propylene, pentene, hexene, cyclohexene and/or styrene.

Other particularly preferred cycloolefin polymers have a melt-flow index of between 0.3-4 g/10 minutes, as measured at a temperature of 230° C. under a load of 2.16 kg.

A partial crystalline alpha-olefin polymer with a crystallite melting temperature between 150 and 170° C. is used as a second component of the polymer mixture used according to the invention.

These are generally semi-crystalline propylene homopolymers that preferably have a crystallite melting temperature of 160 to 165° C. or semi-crystalline propylene-$C_4$-$C_8$-alpha-olefin copolymers, which preferably show a crystallite melting temperature from 150 to 160° C.

In the context of the present description, under crystallite melting temperature a temperature is to be understood which is determined according to ISO 11357 with the differential scanning calorimetry (DSC) method, using a heating speed of 20 K/minute.

Examples of $C_4$-$C_8$-alpha-olefins are butene-1, hexene-1, octene-1.

The selected semi-crystalline polyolefins for the production of the polymer film according to the invention are linear or branched types. The sequence of different monomer units in these polyolefins can be statistical or in the form of blocks. The individual monomer units can be arranged sterically differently, for example isotactic, syndiotactic or atactic.

Preferably used partial crystalline polyolefins are polyolefin homopolymers derived from propylene or polyolefin copolymers derived from propylene with a proportion of up to 10% by weight of higher alpha-olefins with 4-8-C atoms. Copolymers are also polymers derived from three or more different monomers.

Polypropylene is an isotactic, syndiotactic or atactic polypropylene produced by using of stereospecific acting catalysts.

Polypropylene crystallizes when cooled from the melt. The long molecular chains are folded in partial areas and form very small crystallites, which together with amorphous zones can be connected to overstructures, the so-called sphaeroliths. Crystallization is more possible the shorter the chains and the lower the branching level. The crystalline proportion has a higher density than the amorphous proportion. One therefore gets different densities depending on the crystalline content. The level of crystallinity in polypropylene is typically between 35% and 80%, preferably between 60 and 80%.

The density of polypropylene is very low and is between 0.895 g/cm$^3$ and 0.92 g/cm$^3$. Polypropylene usually has a glass transition temperature of 0 to −10° C. The crystallite melting range is usually 160 to 165° C. These temperatures can be modified by copolymerisation; the skilled person is aware of the measures for this.

Particularly preferred partial crystalline alpha-olefin polymers have a melt-flow index of between 2-4 g/10 minutes, as measured at a temperature of 230° C. under a load of 2.16 kg.

The selection of cycloolefin polymers and of the semi-crystalline alpha-olefin polymers is made on a case-by-case basis in such a manner that the glass transition temperature of the former is smaller or equal to the crystallite melting temperature of the latter. This is necessary to ensure the manufacturability of the film from this polymer blend on conventional systems In the polyolefin film according to the invention, the cycloolefin polymer is preferably dispersed in a matrix of the semi-crystalline alpha-olefin polymers and preferably forms a phase in which the dispersed areas are connected to each other (co-continuous phase). By forming such a phase, the shrinkage can be suppressed particularly well.

For the formation of sufficient surface roughness, it is advantageous if the melt-flow indices of the polymers used are specifically selected.

Preferably, the cycloolefin polymer has a melt-flow index of between 0.3 and 4 g/10 minutes, measured at a temperature of 230° C. under a load of 2.16 kg.

Preferably, the semi-crystalline alpha-olefin polymer has a melt-flow index of between 1 and 4 g/10 minutes, measured at a temperature of 230° C. under a load of 2.16 kg.

Preferably, the ratio of melt-flow indices from cycloolefin polymer to partial crystalline alpha-olefin polymer is from 1:2 to 2:1.

The polyolefin film according to the invention, in particular has a low metal content. This is desirable for use as a capacitor film, as traces of metals in the dielectric can have a detrimental effect on the electrical properties of the capacitor.

Preferably, the total content of iron, cobalt, nickel, titanium, molybdenum, vanadium, chromium, copper and aluminum in the film according to the invention is less than 0.25 ppm.

In principle, the polymer blends used in the polymer films according to the invention can be produced by mixing the individual components in suitable devices. Mixing can be advantageously performed in kneaders, rolling mills or extruders.

The amount of cycloolefin polymer in the polymer blend is 10 to 45% by weight, in relation to the overall blend, preferably 15 to 40% by weight, especially 15 to 35% by weight, and especially preferred 20 to 35% by weight.

The amount of semi-crystalline alpha-olefin polymers in the polymer blend is usually 90 to 55% by weight, in relation to the overall blend, preferably 85 to 60% by weight, especially preferred 80 to 65% by weight.

In addition to the mandatory cycloolefin polymer and the semi-crystalline alpha-olefin polymer, the polymer blend may optionally contain commonly used additives. The total proportion of these additives is usually up to 5% by weight, in relation to the total blend, preferably up to 2% by weight.

Admixtures, also known as adjuvants or additives, are substances that are added in small quantities in polymer blends in order to achieve or to improve certain properties, for example in order to have a positive effect on production, storage, processing or product characteristics during and after the use phase.

The additives can be processing aids, such as oils or waxes, or additives that confer the polymer blend or the polyolefin film of the invention a specific function, such as plasticizers, UV stabilizers, matting agents, preservatives, biocides, antioxidants, antistatics, flame repellents, reinforcements, fillers, pigments or dyes.

The polymer film according to the invention is obtained by heat forming of the polymer blend described above. Different heat forming methods can be used. For example, the molding composition can be deformed by extrusion molding using a single-screw extruder or a twin-screw extruder combined with a film nozzle, or the film can be generated directly with a given thickness by a blow-up process or by a calendering process, or a two-stage process can be performed, in which the molding composition is heated and melted and a preformed product is obtained from it, and the product is heated and stretched and, if necessary, fixed by heat.

The invention also relates to a process for producing the polymer film described above comprising the steps:
(i) manufacturing a film containing 10 to 45% by weight of the cycloolefin polymer of component a) described above, and 90-55% by weight of the alpha-olefin polymer of component b) described above, and
(ii) biaxial stretching the film from step i) by sequential stretching or by simultaneous stretching.

In the case of a two-stage process, the procedure from heating and melting to heat fixation first involves the ordinary extrusion pressing of the molding composition. A pre-formed product is produced for stretching (foil, web or hose). During forming the heated and molten molding composition is generally shaped to a given size by an extrusion machine. Alternatively, the molding composition can be formed in a softened state without heating and melting. One-screw extrusion machines or twin-screw extrusion machines can be used. Preferably, a suitable filter is provided for the extruder, which can be used to remove extraneous substances or impurities. The extrusion conditions are selected appropriately by the skilled person depending on different circumstances. The temperature in the extrusion machine is preferably selected in the range from the lowest glass transition temperature of the molding composition to about 50° C. below the decomposition temperature of the molding composition.

The nozzles used can be slot nozzles, T-nozzles or ring nozzles, for example.

The preformed and stretchable product thus obtained is preferably solidified by cooling. The cooling medium can be a gas, a liquid or a cooling roller (e.g. made of metal). The temperature for solidifying by cooling is usually in the range of 20 to 100° C., preferably from 80 to 100° C. The cooling speed can be chosen at will, for example in the range of 3 to 200° C./sec.

The preformed and stretchable product is biaxially stretched to obtain the polyolefin film of the invention. During biaxial stretching, the preformed and stretchable product can be stretched simultaneously in longitudinal direction and in cross direction, or it can be stretched one by one in any order (i.e. first in longitudinal direction and then in cross direction). In addition, stretching can be performed in a single step or in several steps.

The stretching is usually performed in the machine direction ("MD") i.e. in longitudinal direction and transverse to the machine direction ("TD"). The stretch ratio in the machine direction is at least 1:2, preferably at least 1:3 and in particular 1:3 to 1:8. The stretch ratio transverse to the machine direction is at least 1:3, preferably at least 1:5 and very preferred 1:5.5 to 1:10.

The stretch ratio in the area ratio is preferably at least 8-fold, preferably 10-fold to 100-fold and especially preferred 15 to 70-fold. Stretching in MD and TD can also take place in several stages.

Different stretching methods can be used. Examples include using a clamping frame or stretching between rollers. Stretching can take place in one or more separate steps after the stretchable film has been made or follows directly and immediately after the production of the stretchable film. The stretching temperature can generally be set between 10° C. below the glass transition temperature of the cycloolefin polymer used and the crystallite melting point of the alpha-olefin polymer used.

The biaxially stretched polymer film is preferably subjected to thermal fixation after the stretching. This results in a particularly high shape retention at high temperatures. Thermal fixation can be carried out by conventional procedures and is performed, for example, by treating the stretched film at a temperature between the glass transition temperature of the cycloolefin polymer used and the crystallite melting temperature of the alpha-olefin polymer used for about 0.5-20 seconds in a state of relaxation or of the restricted contraction. This thermal fixation can also be performed several times under changed conditions.

Preferably films according to the invention are produced by forming the polymer blend into films using a twin-screw extruder equipped with a degassing device and using a flat-sheet die. Temperatures in the extrusion device are in the usual range for the production of PP films. For example, the temperature of the melt in the extruder is about 260° C. and in the range of the die is about 240° C. Subsequently, the film is stretched biaxially, either simultaneously or sequentially. This typically complies with minimum stretching ratios (stretching factor lengthwise×transverse) of 15, especially 20, in order to produce a final film as thin as possible from the unstretched film.

According to the invention, coextruded multi-layer films can also be produced.

Examples include multi-layer films containing at least one core layer comprising
   a) 10 to 45% by weight of a cycloolefin polymer with a glass transition temperature between 120 and 170° C., and
   b) 90 to 55% by weight of a semi-crystalline alpha-olefin polymer with a crystallite melting temperature between 150 and 170° C.,
   wherein the glass transition temperature of component a) is smaller or equal to the crystallite melting temperature of component b), and which comprises one or two cover layers of one or more partially crystalline alpha-olefin polymers, wherein the multi-layer films have a shrinkage at 130° C. after 5 minutes, as measured according to ISO 11501, of less than or equal to 2%.

Other examples include multi-layer films containing two or more layers each comprising
   (a) 10 to 45% by weight of a cycloolefin polymer with a glass transition temperature between 120 and 170° C., and
   (b) 90 to 55% by weight of a semi-crystalline alpha-olefin polymer with a crystallite melting temperature between 150 and 170° C.,
wherein the glass transition temperature of component a) is smaller or equal to the crystallite melting temperature of component b), wherein the multi-layer films have a shrinkage at 130° C. after 5 minutes, as measured according to ISO 11501, of less than or equal to 2%.

Co-extruded multi-layer films with at least one PP cover layer and at least one COC-PP-blend core layer have the advantage that their surface properties can be adjusted with known techniques common to PP capacitor films, e.g. by selective control of crystallization and by selected formation of spherulites, and that the presence of the COC-PP-blend core layer(s) can improve mechanical and electrical properties of these multi-layer films at higher temperatures.

Lifetime tests on film capacitors made on the one hand from metallized films according to the invention and on the other hand from metallized films made of polypropylene have shown that the former exhibit a significantly increased temperature resistance.

Surprisingly, addition of small proportions of cycloolefin polymers to semi-crystalline polyolefins is already sufficient to significantly reduce the film shrinkage. Compared to pure polypropylene films, the shrinkage of a polyolefin film according to the invention maintains its low values even at significantly higher temperatures.

In contrast to films made of pure cycloolefin polymer, the production of the polyolefin films according to the invention can be carried out on conventional systems using conventional film stretching systems.

The addition of small amounts of cycloolefin polymer to semi-crystalline polyolefins leads to a significant improvement in heat dimensional stability, whereby the good electrical properties known from polypropylene films, such as breakthrough voltage, or their good processability, are conserved.

The polyolefin films described here can be used in different areas, preferably in applications where high dimensional stability and low shrinkage are required at elevated temperatures. Examples of applications include labels, sterilizable films, especially in the food packaging sector, or films used in the medical sector, and particularly preferred capacitor films.

For example, the films according to the invention can be plugged in a capacitor. The invention also concerns the use of the polyolefin film described above as a dielectric for the production of capacitors.

The invention also relates to the use of the polyolefin film described above for the manufacture of labels or for the manufacture of food packaging or for the manufacture of packaging or devices used in the medical field.

For processing especially as a capacitor film, the polyolefin film according to the invention must have a certain surface roughness. This surface roughness $R_a$, as measured by DIN EN ISO 4287, is preferably 0.05 to 0.5 µm. Furthermore, the film according to the invention preferably exhibits a $R_z$, as measured by DIN EN ISO 4287, from 0.1 to 2 µm, in particular from 0.3 to 0.8 µm, and preferably a $R_{max}$, as measured by DIN EN ISO 4287, from 0.1 to 2 µm, in particular from 0.3 to 1 µm.

In capacitor production, the polymer film is typically wrapped on a cooling roller from a wrapping roll and then wound up on another rolling roll. These steps can be carried out several times. For these operations, the film must have sufficient slipperiness (a low coefficient of friction between the films) and smoothness (surface roughness), as the wrap of the film takes place at high speed.

In polypropylene films, the appropriate surface roughness is achieved by controlling crystallization. The spherulites form so-called "lasso or crater structures". Surprisingly, the required surface roughness in the polymer films according to the invention can be adjusted by selecting suitable polymer components, blend morphology and suitable processing conditions, such as processing temperatures and stretching conditions.

Surprisingly, in the polymer films according to the invention, no additives are required to achieve the desired surface roughness.

The polyolefin films according to the invention can be single or multi-layered. Multi-layered films have at least one layer containing the polymer mixture described above.

Preferably, polymer films are single-layer or 2-, 3-, 4- or 5-layer, wherein the multi-layered polymer films contain at least one of the polyolefin films described above.

The polyolefin films according to the invention preferably have dielectric strength as known from polypropylene films, preferably a dielectric strength of >500 V/µm, according to DIN EN 60243-2 as measured by direct voltage at 23° C.

The polyolefin films according to the invention also preferably have a dielectric loss factor of less than 0.002, measured at a frequency in the range from 1 kHz to 1 GHz at a temperature of 25° C.

In general, the thickness of the polyolefin films according to the invention is between 0.5 and 15 µm, preferably between 1 and 10 µm. The film thickness is determined by DIN 53370.

The polyolefin films according to the invention, compared to PP films, have a very low shrinkage, even at high temperatures. Shrinkage at 130° C. is typically less than 2%. In the case of PP films, these values are already reached at 100 to 110° C. and the corresponding values are significantly higher at 130° C.

Preferred polyolefin films according to the invention show in machine direction a shrinkage at 130° C. after 5 minutes, as measured by ISO 11501, of less than or equal to 2%, in particular from 0.1 to 1.5%, and transverse to the machine direction a shrinkage at 130° C. after 5 minutes, measured according to ISO 11501, of less than or equal 0.5%, in particular from 0.01 to 0.2%.

In another preferred embodiment, the polyolefin film according to the invention is metallized on one or both surfaces.

For example, the polyolefin films described here can be plugged in a capacitor. The invention also relates to a capacitor containing one of the polyolefin films described above.

A capacitor film can be obtained by applying a metal layer to the polymer film, for example by evaporation deposition, by laminating or by chemical processes. Depending on the type of capacitor, the metal layer can be applied to both sides or only to one side. In addition, the metal layer can be applied to the entire surface or to only part of the surface. In general, the electrode layer is applied to the entire surface of one side of the polymer film.

Any electrode layers can be used. An electrically conductive material is used, e.g. aluminium, zinc, gold, platinum or copper. This can be used as a metal foil and/or as a metal film applied to the surface of the capacitor film. Usually, evaporated metal films are preferred because the electrode layer can be made thinner, and as a result, volume-related capacity is greater. The polymer film according to the invention shows a very good adhesion to the metal film and also has a low variation in thickness. Evaporated metal films can be produced using known methods, such as vacuum evaporation, sputtering or ion plating.

The thickness of the metal foils or the applied metal films can be chosen at will, but for applied metal films is preferably 100-2000 Å, more preferably 200-1000 Å. When a metal film is used as an electrode layer, its thickness is usually 0.1-100 µm, preferably 1-50 µm, more preferably 3-15 µm.

The capacitors according to the invention can be all common capacitor types. Examples include film capacitors. These are usually wrapped capacitors, in which either the metallic film (the metallized dielectric) or an unmetallized film (unmetallized dielectric) are wound together with a thin metal foil. It is usually distinguished between layer capacitors, round wrap, flat wrap and ring capacitors. The standard production methods of the capacitors are known to the skilled person.

The following Examples describe the invention. No restriction is intended by this.

General Description of the Production of Biaxially Stretched Polyolefin Films and of the Testing Methods The plant used to produce the biaxially stretched polyolefin film according to the invention included (i) a casting unit with a flat-slit die and cooling roller to create a non-oriented film, (ii) a first section for stretching the cast film in machine direction (MD) and (iii) a second section equipped with a heating device for stretching the film in transverse direction (TD), thus obtaining the biaxially stretched film.

The longitudinal stretching unit of the plant usually causes a longitudinal stretching around a stretch factor >3.

The stretching of the longitudinal stretched film in transverse direction (TD) and its transport in longitudinal direction (MD) through the heated transverse stretching furnace (also called a TD oven) was accomplished by two intercurrent chains running on both sides of the TD oven. Both chains are equipped with several equidistant arranged clips. The clips of each chain open before their entrance into the TD oven and then close to grab the longitudinally stretched film, which is continuously fed to the TD oven. The TD furnace generally consists of a pre-heating zone, a stretching zone, a relaxation zone or an annealing zone. Each zone is further divided into shorter sections in which a selected temperature can be set.

The transversal stretching was carried out by an increase in the transverse distance in the stretching zone. In the relaxation zone of the TD furnace, the stretching ratio is slightly reduced by a small decrease in the transverse distance. The biaxially-stretched film was then wrapped on a corresponding winding medium (e.g. a roll of cardboard or metal).

In the described stretching procedure, the film was stretched in longitudinal and transverse direction in separate parts of the system (sequential).

One variant of the stretching process for biaxial oriented films is the simultaneous stretching process. This eliminates the upstream longitudinal stretching via rolls. Instead, the overall stretching of the film takes place in longitudinal and transverse direction in a special version of the furnace in which the surrounding clips are no longer equidistant fixed, but their distance can be individually controlled and enlarged. The film fixed between the clips is simultaneously stretched in lengthwise and in transverse direction. The desired stretch ratios can be adjusted by the geometry of the furnace (transverse) and by appropriate control of the clip distances (lengthwise). As described, for example, in U.S. Pat. No. 5,416,959.

The tensile modulus of the biaxially stretched films in the machine and transverse direction was measured according to ISO 527-3 at 23° C. The speed of the cross head was 1 mm/min.

The thermoshrinkage of the biaxially stretched films was determined in analogy to ISO 11501. Film samples of size of 10×10 cm were cut from the biaxially stretched films, placed in a circulating air oven and treated for 5 minutes at 120° C., 130° C. or 140° C. The relative length decrease of the so treated films was compared with the initial films and presented as % shrinkage.

The surface roughnesses $R_a$, $R_z$, $R_{max}$ of the biaxially stretched films were determined according to DIN EN ISO 4287.

Examples 1-6 and Comparative Examples V1-V5

Polyolefin films were made by applying the general method described above. The composition of the produced biaxially stretched films is shown in table 1. Some properties of the produced biaxially stretched films are shown in table 2.

Different types of COC were used. For example, material from TOPAS Advanced Polymers GmbH, Frankfurt am Main was used (e.g. Topas® 6013, Topas® 6015 or Topas® 6017). The PP can be used from various manufacturers. It is important that—if the produced films are to be used as capacitor films—the PP is a high-purity material (capacitor grade), for example the type Borclean® HC300 BF from Borealis AG. This PP type was partial crystalline and had a crystallite melting temperature of 164° C.

The material TOPAS® 6013 was used as COC1. This had a glass transition temperature of 142° C.

The material TOPAS® 6015 was used as COC2. This had a glass transition temperature of 158° C.

The material TOPAS® 6017 was used as COC3. This had a glass transition temperature of 178° C.

Glass transition temperatures and crystallite melting temperatures were determined using DSC according to ISO 11357-1,-2,-3 (Dynamic Difference Thermoanalysis/Differential Scanning Calorimetry), heating speed 10 K/min for determining glass transition temperatures, heating speed 20 K/min for determining crystallite melting temperatures.

TABLE 1

Composition and processing data of the biaxially stretched films

| Example | film composition COC/% by wt. | PP/% by wt. | stretching process | longitudinal stretching degree of stretching | temperature [° C.] | transversal stretching degree of stretching | temperature [° C.] | film thickness (μm) |
|---|---|---|---|---|---|---|---|---|
| V1 | COC1/100 | — | simultaneous | 3.0 | — | 4.0 | — | failed |
| V2 | COC1/50 | PP/50 | simultaneous | 3.0 | — | 4.0 | — | failed |
| 1 | COC1/45 | PP/55 | simultaneous | 3.0 | 160 | 4.0 | 160 | 8.3 |
| 2 | COC1/40 | PP/60 | simultaneous | 3.8 | 163 | 4.1 | 163 | 7.5 |
| 2a | COC1/40 | PP/60 | sequential | 2.2 | 147 | 5.0 | 168 | 11 |
| V3 | COC1/40 | PP/60 | sequential | 3.0 | — | 5.0 | — | failed |
| 3 | COC1/30 | PP/70 | sequential | 3.0 | 147 | 6.0 | 168 | 9 |
| 4 | COC1/20 | PP/80 | sequential | 3.3 | 147 | 6.3 | 168 | 8 |
| 5 | COC2/20 | PP/80 | sequential | 3.2 | 148 | 6.5 | 172 | 9 |
| 6 | COC1/20 | PP/80 | simultaneous | 3.8 | 163 | 8 | 163 | 6 |
| V4 | COC3/20 | PP/80 | sequential | 3.2 | — | 6.3 | — | failed |
| V5 | — | PP/100 | sequential | 4.6 | 137 | 9.0 | 164 | 8 |

Note:
Failed means that continuous stretching is not possible at the selected (or higher) degree of stretching, there is no suitable process window (temperature window).

The results in table 1 show that films containing at least 55% PP and 45% COC with usual sequential or simultaneous stretching processes can be continuously stretched under similar conditions as films from 100% PP. The results in table 1 also show that with COC levels of 40% by weight and higher the stretchability may depend on the nature of the stretching procedure and that only lower levels of stretching can be realized than with compositions with lower amounts of COC.

Examples 2, 2a and V3 show that when using compositions whose COC content is at the upper end of the claimed compositions, the type of stretching and the process parameters chosen in the production of the stretched films may influence the result. Here, however, films can still be produced using sequential stretching; however, only lower levels of stretching are possible, so that very thin films can no longer be obtained when using these stretching conditions.

Examples 4, 5 and V4 show that when a COC with a glass transition temperature is used outside the claimed range, the stretching no longer succeeds.

Examples 4 and 6 show that simultaneous and sequential stretching is possible in the claimed formulation range. Higher degrees of stretching were achieved in the simultaneous stretching process.

TABLE 2

Properties of biaxially stretched films

| Example | tensile modulus MD [N/mm$^2$] | TD [N/mm$^2$] | surface roughness $R_a$ [μm] | surface roughness $R_z/R_{max}$ [μm] | thermo shrinkage at 120° C./5 min. MD [%] | TD [%] | thermo shrinkage at 130° C./5 minutes MD [%] | TD [%] | thermo shrinkage at 140° C./5 minutes MD [%] | TD [%] |
|---|---|---|---|---|---|---|---|---|---|---|
| V1 | | | no biaxial stretching possible | | | | | | | |
| V2 | | | no biaxial stretching possible | | | | | | | |
| 1 | 2795 | 3112 | 0.13-019 | 0.7-1.1 0.9-1.2 | 0.75 | 0.18 | 1.30 | 0.29 | 2.10 | 0.39 |
| 2 | 2814 | 3129 | 0.12-0.18 | 0.8-1.1 1.0-1.3 | 0.77 | 0.20 | 1.35 | 0.28 | 2.19 | 0.44 |
| 2a | 2843 | 4026 | 0.06-0.11 | 0.5-1.0 0.8-1.1 | 0.9 | 0.12 | 1.43 | 0.22 | 2.41 | 0.30 |
| V3 | | | no biaxial stretching possible | | | | | | | |
| 3 | 2758 | 4006 | 0.05-0.12 | 0.3-0.8 0.4-1.0 | 1.00 | −0.04 | 1.51 | −0.10 | 2.88 | 0.13 |
| 4 | 2592 | 3914 | 0.05-0.09 | 0.3-0.6; 0.4-0.7 | 1.00 | 0.07 | 1.95 | 0.00 | 3.4 | 0.57 |
| 5 | 3135 | 4190 | 0.10-0.13 | 0.7-0.9 0.9-1.1 | 1.00 | 0.00 | 1.77 | 0.23 | 2.83 | 0.30 |
| 6 | 2871 | 4132 | 0.09-0.16 | 0.6-1.2 0.8-1.2 | 0.83 | 0.15 | 1.41 | 0.18 | 2.06 | 0.27 |
| V4 | | | no biaxial stretching possible | | | | | | | |
| V5 | 2557 | 5321 | 0.06-0.1 | 0.6-0.10 0.6-1.0 | 3.28 | 0.38 | 4.5 | 2.2 | 5.2 | 3.1 |

The results in table 2 demonstrate that polymer blends containing PP and at least 10% COC can be processed into films with low thermal shrinkage values. It is also shown that the values for the thermal shrinkage of the COC containing films at 140° C. correspond to the values for the thermal shrinkage of the PP films at 120° C.

Examples of 7-8

Polyolefin films were produced by applying the general method described above. Examples 7 and 8 demonstrate how the roughness of the films can be varied. Composition and roughness of the biaxially stretched films produced is shown in table 3.

Material from TOPAS Advanced Polymers GmbH, Frankfurt am Main was used (Topas® 6013). The PP can be used from various manufacturers. It is important that—if the produced films are to be used as capacitor films—the PP is a highly pure material (capacitor grade), for example the Type Borclean® HC300 BF from Borealis AG.

TABLE 3

Composition and process data of biaxially stretched films

| | film composition | | stretching | longitudinal stretching | | transversal stretching | | surface roughness |
|---|---|---|---|---|---|---|---|---|
| Example | COC/% | PP/% | process | degree of stretching | temperature [° C.] | degree of stretching | temperature [° C.] | $R_a$ (μm) |
| 7 | COC1/40 | PP/60 | simultaneous | 3.8 | 163 | 4.1 | 163 | 0.06-0.11 |
| 8 | COC1/40 | PP/60 | simultaneous | 3.0 | 163 | 4.1 | 163 | 0.04-0.07 |

The results in table 3 demonstrate that the roughness of the films produced can be adjusted by process parameters, such as longitudinal stretching conditions.

The invention claimed is:

1. A capacitor comprising a biaxially stretched polyolefin film, containing:
   a) 10 to 45% by weight of a cycloolefin polymer with a glass transition temperature between 12° and 170° C., and
   b) 90 to 55% by weight of a semi-crystalline alpha-olefin polymer with a crystallite melting temperature between 15° and 170° C.;
   wherein the glass transition temperature of component a) is less than or equal to the crystallite melting temperature of component b), and wherein the polyolefin film has a shrinkage at 130° C. after 5 minutes, as measured according to ISO 11501, of less than or equal to 2%.

2. The capacitor according to claim 1, wherein cycloolefin copolymers are used, which are derived from the ring-sustaining copolymerisation of at least one cycloolefin of the general formula (I) with at least one alpha-olefin of the formula (II)

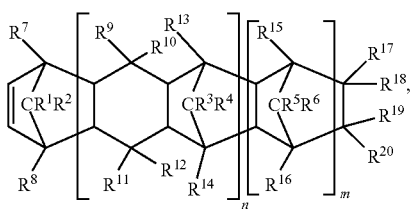

(I)

in which n is 0 or 1,
m is 0 or a positive integer,
$R^1$, $R^2$, $R^3$, $R^4$, $R^5$, $R^6$ independently of one another are hydrogen, halogen, alkyl, cycloalkyl, aryl or aralkyl,
$R^7$, $R^8$, $R^9$, $R^{10}$, $R^{11}$, $R^{12}$, $R^{13}$, $R^{14}$, $R^{15}$, $R^{16}$ independently of one another are hydrogen or alkyl,
$R^{17}$, $R^{18}$, $R^{19}$, $R^{20}$ independently of one another are hydrogen, halogen or alkyl, or
in which $R^{17}$ and $R^{19}$ together with the carbon atom to which they are bonded form a saturated or unsaturated ring or a plurality of saturated or unsaturated rings, and

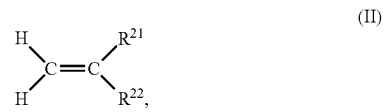

(II)

in which $R^{21}$ and $R^{22}$ independently of one another are hydrogen or alkyl.

3. The capacitor according to claim 2, wherein the compound of formula I is norbornene or tetracyclododecene, and the compound of formula II is ethylene and/or propylene, and wherein the compounds of formulae I and II have been copolymerized in the presence of a metallocene catalyst.

4. The capacitor according to claim 1, wherein the semi crystalline alpha-olefin polymer is a semi crystalline alpha-olefin homo- or -copolymer which is obtained from copolymerisation of propylene with an amount of less than or equal to 5% by weight of an alpha-olefin with two or with four to eight carbon atoms.

5. The capacitor according to claim 2, wherein the glass transition temperature of the cycloolefin copolymers is between 13° and 170° C.

6. The capacitor according to claim 2, wherein the cycloolefin copolymers have a melt-flow-index between 0.3-4 g/10 minutes, as measured at a temperature of 230° C. under a load of 2.16 kg, or wherein the semi crystalline alpha-olefin polymer has a melt-flow-index between 1-4 g/10 minutes, as measured at a temperature of 230° C. under a load of 2.16 kg.

7. The capacitor according to claim 1, wherein the cycloolefin polymer is dispersed in a matrix of the semi crystalline alpha-olefin polymer.

8. The capacitor according to claim 7, wherein the cycloolefin polymer forms a co-continuous phase in the matrix of the semi crystalline alpha-olefin polymer.

9. The capacitor according to claim 1, wherein its total content of iron, cobalt, nickel, titanium, molybdenum, vanadium, chromium, copper and aluminium is less than 0.25 ppm.

10. The capacitor according to claim 1, wherein the film has a thickness between 1 and 10 μm, as measured according to DIN 53370.

11. The capacitor according to claim 1, wherein the film has a shrinkage in a machine direction at 130° C. after 5 minutes, as measured by ISO 11501, of less than or equal to 2%, and a shrinkage transverse to the machine direction at 130° C. after 5 minutes, as measured according to ISO 11501, of less than or equal 0.5%.

12. A capacitor comprising a multilayer film having at least a core layer, comprising the biaxially stretched polyolefin film according to claim 1, and one or two cover layers of one or more partially crystalline alpha-olefin polymers; wherein the multilayer film has a shrinkage at 130° C. after 5 minutes, as measured according to ISO 11501, of less than or equal to 2%.

13. The capacitor according to claim 1, wherein the film has a surface roughness $R_a$, as measured according to DIN EN ISO 4287, from 0.04 to 0.2 µm.

14. The capacitor according to claim 13, wherein the film has a surface roughness $R_z$, as measured according to DIN EN ISO 4287, from 0.3 to 0.8 µm.

15. A capacitor, comprising: a biaxially stretched polyolefin film, consisting essentially of:
   a) 10 to 45% by weight of a cycloolefin polymer with a glass transition temperature between 12° and 170° C.,
   b) 90 to 55% by weight of a semi-crystalline alpha-olefin polymer with a crystallite melting temperature between 15° and 170° C., and
   c) 0 to 5% by weight of an additive selected from the group consisting of processing aids, plasticizers, UV stabilizers, matting agents, preservatives, biocides, antioxidants, antistatics, flame repellents, reinforcements, fillers, pigments and dyes;
   wherein the glass transition temperature of component a) is less than or equal to the crystallite melting temperature of component b), and wherein the polyolefin film has a shrinkage at 130° C. after 5 minutes, as measured according to ISO 11501, of less than or equal to 2%.

16. A capacitor, comprising: a biaxially stretched polyolefin film, consisting of:
   a) 10 to 45% by weight of a cycloolefin polymer with a glass transition temperature between 12° and 170° C.,
   b) 90 to 55% by weight of a polypropylene homopolymer with crystallite melting temperature ranging from 160 to 165° C., and
   c) 0 to 5% by weight of an additive selected from the group consisting of processing aids, plasticizers, UV stabilizers, matting agents, preservatives, biocides, antioxidants, antistatics, flame repellents, reinforcements, fillers, pigments and dyes;
   wherein the glass transition temperature of component a) is less than or equal to the crystallite melting temperature of component b), and wherein the polyolefin film has a shrinkage at 130° C. after 5 minutes, as measured according to ISO 11501, of less than or equal to 2%.

17. The capacitor according to claim 4, wherein the semi crystalline alpha-olefin polymer is a semi crystalline alpha-olefin homopolymer.

18. The capacitor according to claim 17, wherein the semi crystalline alpha-olefin polymer is a polypropylene homopolymer with crystallite melting temperature ranging from 160 to 165° C.

19. The capacitor of claim 16, wherein the biaxially stretched polyolefin film includes 0% by weight of the additive.

20. A capacitor, comprising: a biaxially stretched polyolefin film, containing:
   a) 10 to 45% by weight of a cycloolefin polymer with a glass transition temperature between 12° and 170° C., and
   b) 90 to 55% by weight of a semi-crystalline alpha-olefin polymer with a crystallite melting temperature between 15° and 170° C.;
   wherein the glass transition temperature of component a) is less than or equal to the crystallite melting temperature of component b);
   wherein the biaxially stretched polyolefin film has a shrinkage at 130° C. after 5 minutes, as measured according to ISO 11501, of less than or equal to 2%; and
   wherein the biaxially stretched polyolefin film has a surface roughness $R^a$, as measured according to DIN EN ISO 4287, from 0.02 to 0.5 µm.

21. The capacitor according to claim 20, wherein the biaxially stretch polyolefin film has a surface roughness $R_z$, as measured according to DIN EN ISO 4287, from 0.1 to 2 µm.

22. A capacitor, comprising: a biaxially stretched polyolefin film, containing:
   a) 10 to 45% by weight of a cycloolefin polymer with a glass transition temperature between 12° and 170° C., and
   b) 90 to 55% by weight of a semi-crystalline alpha-olefin polymer with a crystallite melting temperature between 15° and 170° C.,
   wherein the glass transition temperature of component a) is less than or equal to the crystallite melting temperature of component b);
   wherein the biaxially stretched polyolefin film has a shrinkage at 130° C. after 5 minutes, as measured according to ISO 11501, of less than or equal to 2%;
   wherein the biaxially stretched polyolefin film has a dielectric strength from 500 to 750 V/µm, according to DIN EN 60243-2 as measured by direct voltage; and
   wherein the biaxially stretched polyolefin film has a dielectric loss factor of less than 0.002, as measured at a frequency between 1 kHz and 1 GHz at a temperature of 25° C.

23. The capacitor of claim 1, wherein the cycloolefin polymer is selected from the group consisting of a cycloolefin copolymer and a cycloolefin polymer derived from ring-opening polymerisation of cyclopentadiene.

* * * * *